(12) United States Patent
Chen et al.

(10) Patent No.: US 9,294,729 B2
(45) Date of Patent: Mar. 22, 2016

(54) SYSTEM AND METHOD FOR PROVIDING CONTENT OVER A TELEVISION NETWORK

(75) Inventors: David Chen, Fremont, CA (US); Scott Pettit, San Antonio, TX (US); Anthony Haeuser, Aurora, IL (US); Mary McCarthy, San Antonio, TX (US); Chris Lee, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1914 days.

(21) Appl. No.: 11/335,288

(22) Filed: Jan. 19, 2006

(65) Prior Publication Data
US 2007/0169144 A1 Jul. 19, 2007

(51) Int. Cl.
*H04N 7/173* (2011.01)
*H04N 21/2547* (2011.01)
*H04N 21/258* (2011.01)
*H04N 21/2668* (2011.01)
*H04N 21/472* (2011.01)
*H04N 21/475* (2011.01)

(52) U.S. Cl.
CPC ....... *H04N 7/17318* (2013.01); *H04N 21/2547* (2013.01); *H04N 21/25866* (2013.01); *H04N 21/25875* (2013.01); *H04N 21/25891* (2013.01); *H04N 21/2668* (2013.01); *H04N 21/4751* (2013.01); *H04N 21/47202* (2013.01)

(58) Field of Classification Search
USPC ......... 705/1, 35–45, 63; 709/219; 725/34, 95, 725/109
See application file for complete search history.

(56) References Cited

U.S. PATENT DOCUMENTS

| | | | |
|---|---|---|---|
| 5,138,549 A | 8/1992 | Bern | |
| 5,724,424 A | 3/1998 | Gifford | |
| 5,819,285 A | 10/1998 | Damico et al. | |
| 5,991,750 A | 11/1999 | Watson | |
| 6,029,141 A | 2/2000 | Bezos et al. | |
| 6,496,867 B1 | 12/2002 | Beser et al. | |
| 6,553,412 B1* | 4/2003 | Kloba et al. | 709/219 |
| 6,622,306 B1* | 9/2003 | Kamada | G06F 17/30899 257/E21.552 |
| 6,850,991 B1* | 2/2005 | Young et al. | 709/246 |
| 7,464,056 B1* | 12/2008 | Campbell | G06Q 20/10 705/39 |
| 7,516,045 B2* | 4/2009 | Butler | G06F 17/30905 702/183 |
| 2001/0003184 A1* | 6/2001 | Ching | G06F 3/0237 |
| 2001/0037205 A1* | 11/2001 | Joao | 705/1 |
| 2002/0023270 A1* | 2/2002 | Thomas et al. | 725/95 |
| 2002/0069176 A1* | 6/2002 | Newman | 705/53 |
| 2002/0069286 A1* | 6/2002 | Yu | H04L 63/083 709/229 |
| 2002/0120930 A1* | 8/2002 | Yona | 725/34 |
| 2002/0194095 A1* | 12/2002 | Koren | G06F 17/30893 705/35 |
| 2003/0137534 A1* | 7/2003 | Hong | H04N 5/44504 715/738 |
| 2003/0229595 A1* | 12/2003 | Mononen et al. | 705/63 |
| 2004/0181801 A1* | 9/2004 | Hagen | G06Q 20/00 725/32 |
| 2004/0226051 A1* | 11/2004 | Carney | H04N 5/44543 725/135 |
| 2005/0076384 A1* | 4/2005 | Upendran et al. | 725/109 |
| 2005/0091075 A1* | 4/2005 | Cohen et al. | 705/1 |
| 2006/0010479 A1* | 1/2006 | Lu | H04N 17/17309 725/112 |
| 2006/0015906 A1* | 1/2006 | Boyer | H04N 5/445 725/51 |
| 2006/0123076 A1* | 6/2006 | Raiyat | H04N 5/445 709/203 |
| 2006/0184427 A1* | 8/2006 | Singh | G06Q 30/00 705/26.1 |

(Continued)

*Primary Examiner* — Robert R Niquette
(74) *Attorney, Agent, or Firm* — Jackson Walker L.L.P.

(57) ABSTRACT

The present disclosure provides a system and method for providing content over a television network. The method includes receiving an input that corresponds to a master account, associating the master account with at least one additional account that relates to the provision of content from a content provider and delivering the content over the television network.

21 Claims, 6 Drawing Sheets

(56) References Cited

U.S. PATENT DOCUMENTS

2006/0224402 A1* 10/2006 Hanna ............... G06Q 10/06
705/34

2007/0112575 A1* 5/2007 Savoor ............ G06Q 10/06375
705/7.34
2008/0046942 A1* 2/2008 Merlin ............... H04N 21/4316
725/110

* cited by examiner

SYSTEM AND METHOD FOR PROVIDING CONTENT OVER A TELEVISION NETWORK

BACKGROUND OF THE DISCLOSURE

1. Field of the Disclosure

The present disclosure relates to the provision content over a television network.

2. Description of the Related Art

Television services such as Internet Protocol Television (IPTV), cable television service, or satellite television service are provided by service providers with whom customers establish an account for the service. A large number of television channels are delivered to a customer premise device, such a set top box, over a television network established by the service provider. Such networks operate in conjunction with the Internet and have access to various content providers, such as providers of Internet access, financial information, weather information, sports information, etc. IPTV is capable of delivering interactive television services to customers from these various content providers, also referred to herein as "partners" of the service provider. Individual customers typically establish separate accounts with certain of these content providers to obtain customer specific information. Often, customers can specify the content they wish to receive and the format therefor. For example, information about particular stocks or an investment portfolio, sports information about certain teams, photo albums created by the customer with the content provider via the web, product ordering, etc. Often, customers are required to log in for each such service and provide other personal information such as credit cards, telephone numbers, etc.

In the television environment, a limited capability exists for the customers to authenticate customer identity for each such service. The form factor of current television systems, however, does not support customer data entry via remote control devices. Thus, difficulties associated with the input of customer identities, such as a log-on, password, and credit card information can become a barrier to adapting multiple interactive television applications and/or to exploiting the interactive television potential.

Thus, there is a need for an improved system and method for providing content over a television network from content providers.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals, wherein.

DETAILED DESCRIPTION OF THE EMBODIMENTS

Figure 1:
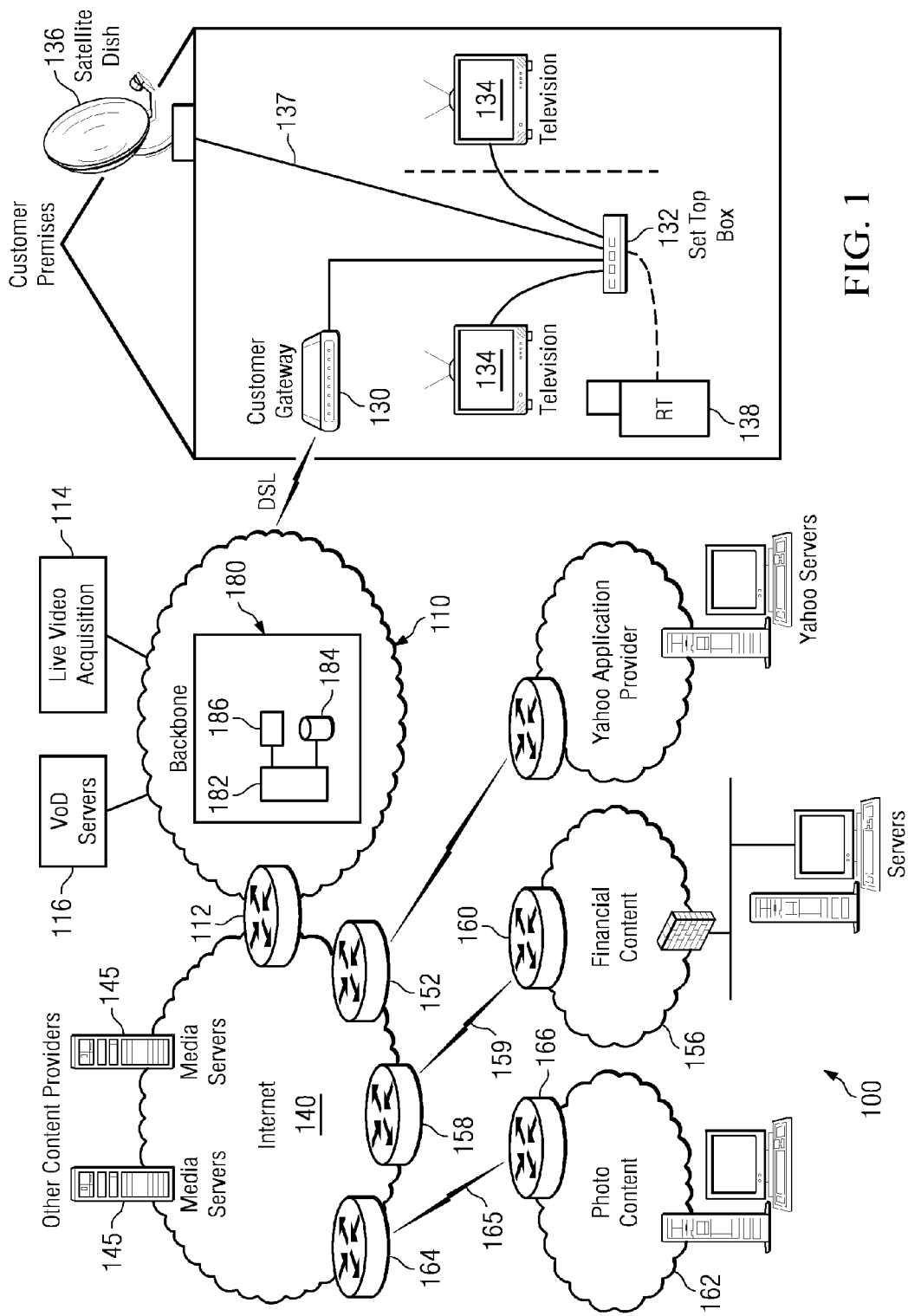
FIG. 1 is a functional diagram of an exemplary network for providing television services according to one embodiment of the present disclosure.

In view of the above, the present invention through one or more of its various aspects and/or embodiments is presented to provide one or more advantages, such as those noted below.

The present disclosure, in one aspect, provides a method for delivering content over a television network that includes receiving an input that corresponds to a master account, associating the master account with at least one additional account that relates to provision of content from a content provider and providing the content over the television network. In another aspect, the disclosure provides a computer program which includes instructions that may be executed by a computer, wherein the computer program contains an instruction to receive an input relating to a master account for provision of a television service, an instruction to associate the master account with at least one additional account that relates to provision of content from a content provider and an instruction to provide the television service and the content from the content provider over a television network. The present disclosure, yet in another aspect, provides a system for providing content over a television network. The system includes a database that stores a master account and at least one additional account relating to the provision of content from a content provider. The server executes instructions contained in a computer program that includes an instruction to associate the master account with the at least one additional account and an instruction to provide the content from the content provider over a television network.

The present disclosure, in an another aspect, provides a system and method that automatically associates a first or master account (which may be a television account) of a customer relating to the provision of a television service with one or more customer accounts established for services from third party or other content providers, and delivers the television service and the contents from such content providers over a television network. In one aspect, the system provides such contents without requiring the customer to identify or input customer accounts, when the customer requests such services via the television. The system, in another aspect, provides a seamless access to multiple TV applications without a log-in by the customer. In another aspect, the system provides a backend solution, transparent to the customer, that links the master account, such as the customer television account, with the customer accounts in other domains, such as broadband internet service, voice service including Voice over Internet Protocol (VoIP), a wireless service, and other third party services, and can pass along account information, upon receiving an input, such as a one touch customer approval input to the third parties. For the purpose of this disclosure, the term "content" is used in a broad sense to mean any information provided over a network, including video, voice and data. The term "television service" means a content provided over any television network The term "master account" means any account or identifier that is associated with the provision of a content. A master account may be an account set up to provide a television service to a customer. The master account may be associated with sub-accounts. For example, two accounts for a customer may relate to or be associated with a master or primary account, for example, one for each set top box, wherein each sub-account may receive the same or different content in response to an input for each subaccount.

In another aspect, the present disclosure enables a customer to order products or services via a single click on a television icon using the master account information passed along to the selected vendors. In another aspect, the present disclosure provides an interactive television service method that includes storing a master account relating to the provision of a television service (a television account), storing one or more accounts of the customer that correspond to content provided by third parties or partners, and automatically associating the master account with the partner accounts when the customer requests such contents via a television and providing access to such third party content over the television. The method may send a video content in the form of a viewable bar to the television that includes one or more icons, such as "Go interactive," which may be clicked by the customer via a remote control to request a content provided pursuant to a particular account. The partner content may be personalized by the customer. For example, it may include personalized financial information, personal sports information, photo albums created by the customer over the Internet that resides with a content provider and interactive game service that enables the customer to play games with others over the television, etc.

In another aspect, the present disclosure provides a computer program embedded in a computer readable medium that is executable by a processor or server. The computer program includes an instruction to automatically associate or correlate a master or first account with one or more additional accounts that relate to the provision of content by content providers, and an instruction that delivers to a customer device or provides access via the customer device to the contents from content providers upon receiving an input from the customer. The input may be initiated by a click on a television that sends a request via the set top box.

The present disclosure, in another aspect, provides a system that includes a database that stores customer information, including a master or television account and at least one customer account relating to a TV application (content) provided by a content provider (partner). The system further includes a server that executes instructions contained in a computer program. The computer program includes an instruction to automatically associate the master account with the partner accounts upon receiving an input from a customer device and instructions to provide the customer the television service and access to the contents from the partners.

In another aspect, the disclosure provides a television network which may be an Internet Protocol Television (IPTV) network, a cable television network or a satellite television network. The network includes a backbone (or network) that includes a server and a customer database. The backbone is coupled to each of the partner systems. The network provides television services that includes a number of channels provided to each subscriber or customers and may provide additional channels that provide content specific to the customers, each such channel may have an associated account with the service provider or a third party partner. When a customer provides an input such as by clicking on a "Go Interactive" icon on the television screen or a selected button on a remote control, the STB sends a message to the servers in the backbone, which automatically associates the master account with the partner accounts and provides content to a customer device over the television network.

FIG. 1 shows a high level functional diagram of a network 100 for providing IPTV services according to one embodiment of the present disclosure. The network 100 is shown to include a backbone 110 that may be coupled to the Internet 140 via one or more routers, such as a router 112. The backbone also may include a variety of servers, routers and transport links. The backbone 110 is shown coupled to a live television content provider 114, that may include multiple television channels, such as commonly delivered over television networks. The backbone 110 also is shown to include Video-on-Demand (VOD) servers 116 that provide Video-on-Demand to customers. The backbone 114 is shown coupled via a Digital Subscriber Line (DSL) to a customer gateway, such as a modem 130, which may be coupled to a set-top-box (STB) 132 that is connected to a television (TV) 134. The STB may act as a control interface for the TV 134 and may be accessed by remote control 138. Alternatively, the transmission of the television services and other contents may be delivered to the STB 132 via a satellite device 136 over a link 137. The network 100 is further shown coupled to systems of a number of content providers, (also referred herein as partners) over the Internet 140. For example, the backbone 110 is shown coupled to an internet service provider "Yahoo" 150 via routers 152 and 154, and a link 153; a financial content provider 156 via routers 158 and 160, and a link 159; a photo content provider 162 that provides photo albums stored by the customer over the internet via routers 164 and 166, and a link 165. Similarly, the backbone 110 may be coupled to or have access to any other partner content provider (generally designated by number 145), such as an interactive gaming service that enables a customer to play games against other players via a television, and a gaming service that enables a customer to bet online and settle accounts. The network 100 also may provide access to a variety of other servers, such as multimedia services 170, data centers that provide billing services, etc.

Still referring to FIG. 1, the backbone network 110 includes an auto-account association system 180 that includes one or more servers 182, a database 184 that stores customer information and a set of computer programs 186 which contains instructions that are executed by the server 182 to perform the methods and functions described herein. The customer information stored in the database 184 may include a master account, such as the television account, for the customer that is assigned by the IPTV service provider. The master account may be an IP address, an identifier associated with the STB 132, or any other suitable identifier. In addition, the database 182 stores customer account numbers or identifiers that the customer has set up with partner content providers. In addition, the customer information may include account numbers for other relevant domains, such as broadband and voice, including Voice over Internet Protocol (VoIP), credit card numbers that may be charged for interactive activity by the customer, such as for buying merchandise, downloading videos, settling accounts, etc. A customer may set up accounts with the partners and provide to the television service providers for entry into the database 184 or may enter via the web such information into the database 184. Additionally, customers may predefine or set up preferences for each of the partner accounts. For example, the customer may specify or create a home page with the financial service provider 160 that is specific to the customer, which may include information of certain stocks and investment portfolio information of the customer. Similarly, the sports information may specify preferences such as statistics or other information about certain teams or a request for receiving news about a particular team. In general, each account may have personalized content that the partner or content provider is set up to deliver to the customer.

In one aspect, when a customer turns on a television, the backbone network 110 provides an on-screen indication or icon, such as "go interactive," if the customer clicks on "go-interactive," the STB sends a signal to the system 180, which automatically correlates or associates the master account with the partner accounts. For example, assume the customer has an account for an on-line service, such as "Yahoo" on-line service, which account already is stored in the database 184. The system 180 automatically associates the master account with the Yahoo account and may deliver video indication on the television that identifies personalized on-line services for that customer.

Figure 2:
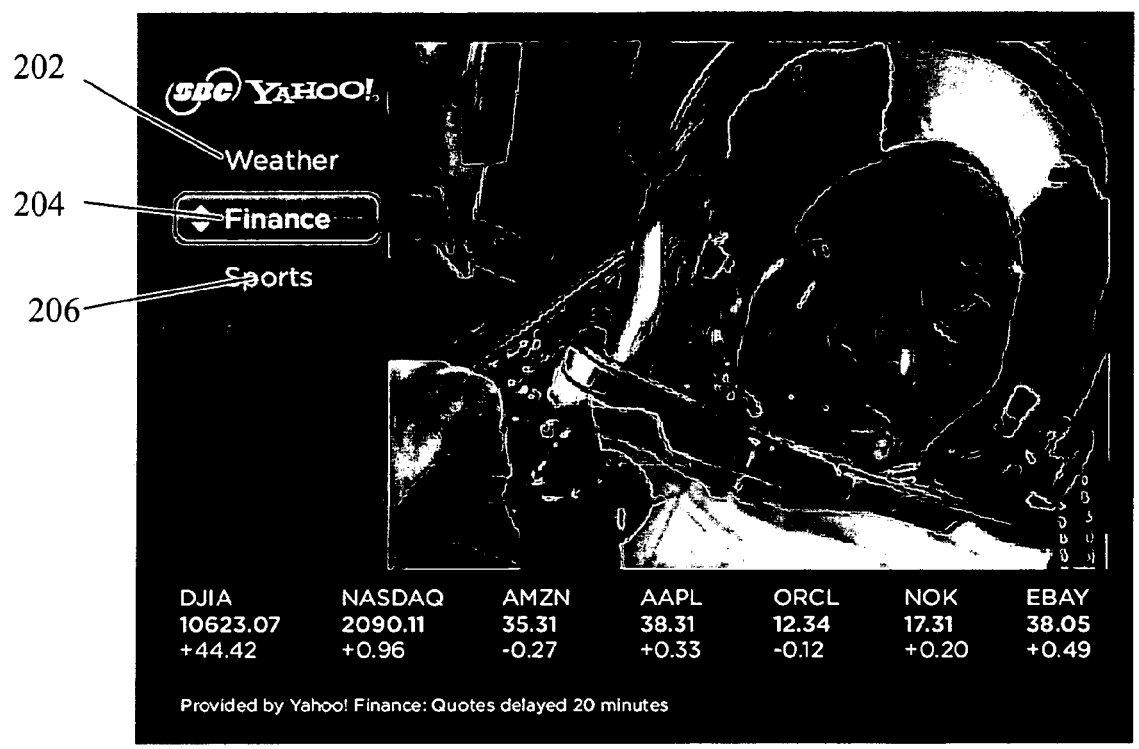
FIG. 2 is an exemplary screen shot that shows a bar that provides icons that might be clicked to obtain a particular content over the network of FIG. 1.

FIG. 2 shows an exemplary television screen shot that shows weather 202, finance 204, and sports 206 as examples of services in the form sometimes referred to as an LBar that are associated with the customer's Yahoo account. The customer may simply click any of these icons and receive the corresponding personalized content.

Figure 3:
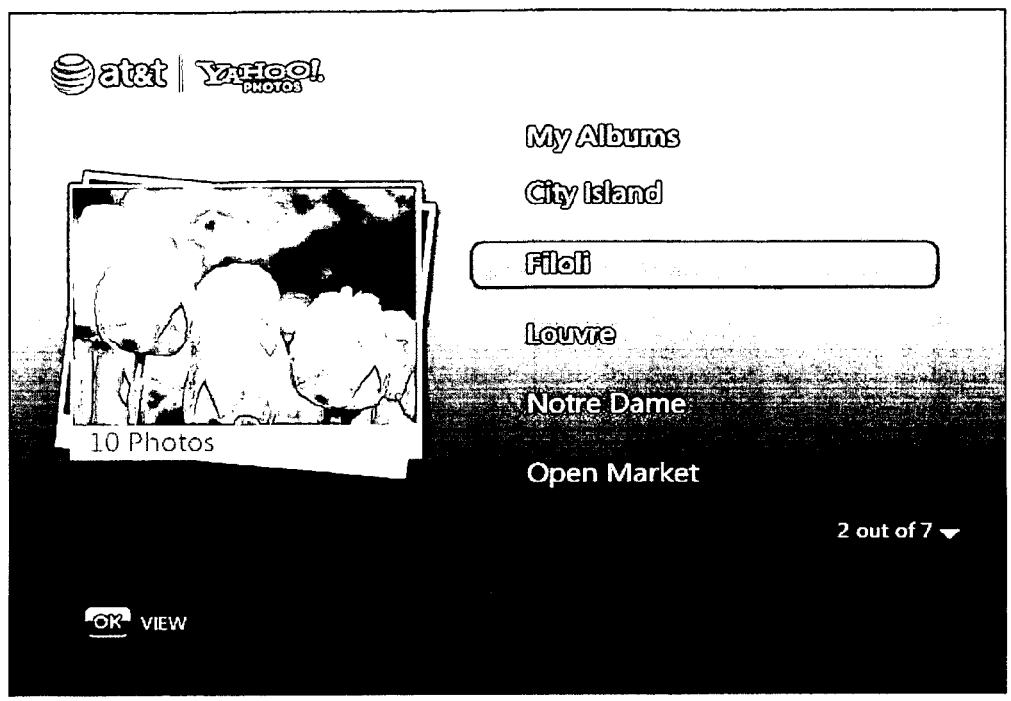
FIG. 3 is an exemplary screen shot that appears when a channel specific to a content provider is clicked on a television.

In another aspect, the IPTV system 100 may utilize a dedicated channel for a particular partner service. For example, channel #302 may be reserved for Yahoo, channel #303 for interactive sports information, channel #304 for financial information, #305 interactive games, etc. In such a case, when the customer clicks on a particular channel, for example, channel #305, the system 180 automatically associates the master account with the appropriate partner account, retrieves the information from the partner system and delivers it to the customer STB 132. FIG. 3 shows an exemplary television screen shot that is displayed when a channel that corresponds an account with a content provider is clicked, such as a photo channel.

Figure 4:
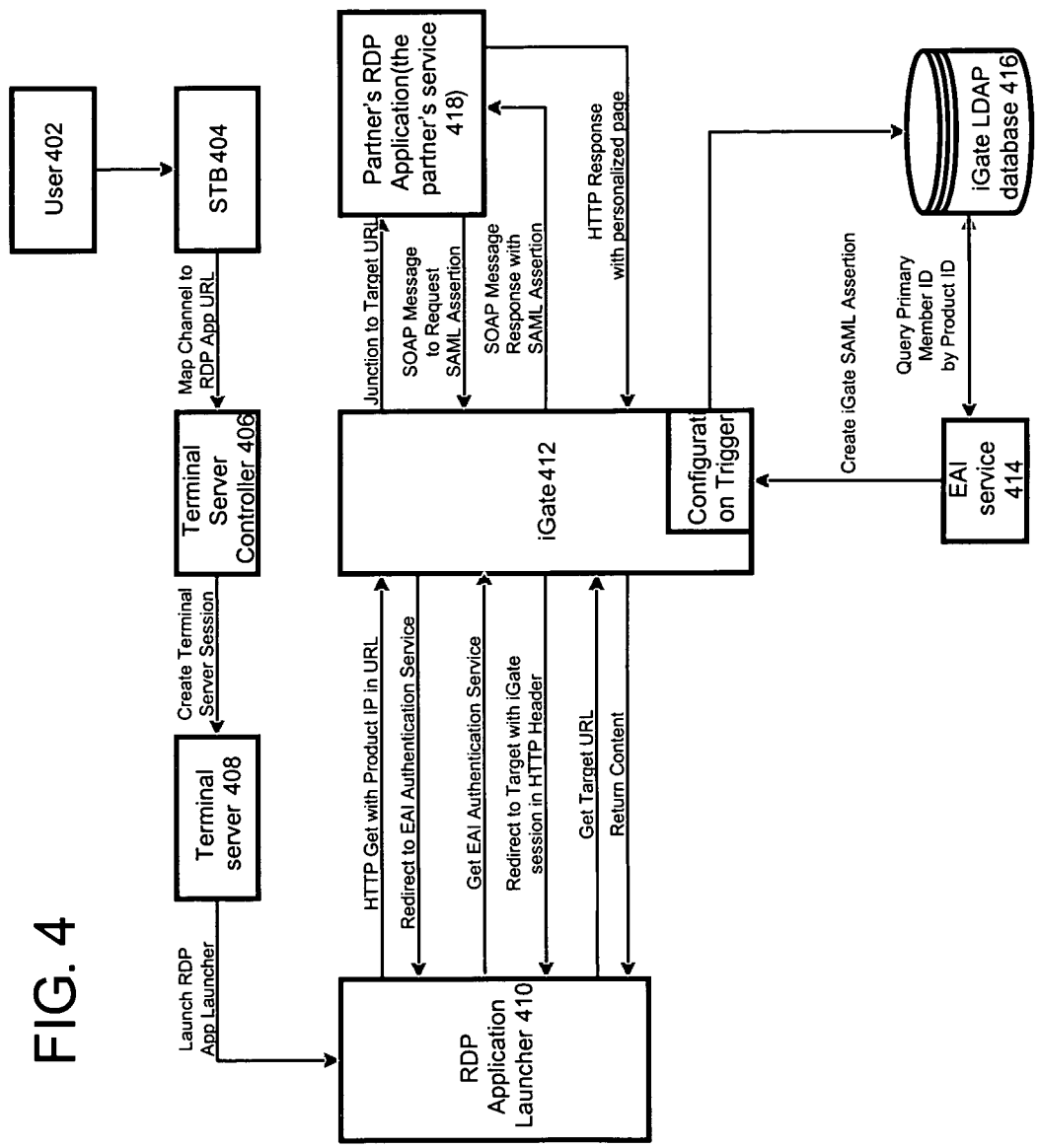
FIG. 4 is an exemplary system architecture that may be utilized to implement the delivery of contents from multiple content providers by automatically associating multiple customer accounts according to one embodiment of the present disclosure.

FIG. 4 shows an exemplary system architecture that may be utilized to implement the methods of the present disclosure. A user 402, within a home or other customer premise, is shown watching a television to which a set top box (STB) 404 is coupled. The user 402 may execute a client application at customer premises, such as a home or office, associated with the user 402. The set top box 404 selects a channel or an icon in accordance with the user input, and if the channel or icon selection indicates that the user desires to access interactive television (ITV), maps the channel to a Remote Desktop Protocol (RDP) application uniform resource locator (URL). In response, a terminal server controller 406 creates a terminal server session within a terminal server 408. An RDP Application Launcher 410 associated with the terminal server 408 launches any of several RDP applications, including a browser that transmits a product ID to a target URL via a hypertext transfer protocol (HTTP) message. In general, an RDP Application enables applications run on a remote application server and display on a TV using remote desk top protocol. The same protocol is used on terminal server 408.

The RDP application launcher 410 may launch an application that is accessible by the user 402 (or by the client application that the user 402 is running at a customer premises). RDP application launcher may run windows type applications through Remote Desktop Protocol. Also RDP application launcher can redraw graphics between a client (e.g. an STB) and a server. The RDP application launcher 410 may also authenticate and identify the user 402 based upon a user identification received from the set top box 404.

The RDP application launcher 410 may provide any number of network services to the user 402. For example, the RDP application launcher 410 may provide access to an STB-independent network DVR that a customer 402 has updated via a cell phone. Video images that the user 402 has captured via a cellular telephone and uploaded to the master account via a cellular network may be accessible via an RDP application launched by the RDP application launcher 410. The RDP application launcher 410 may also launch IPTV network services.

The system 400 includes a subsystem or a server system that includes a server 412 that has associated application programs, such as iGate available from third parties, an associated EAI (Enterprise Application Interface) service 414 and a database 416. The data base 416 stores the television account (master account) and all relevant account information about the customers, including partner accounts, credit card, and other information such as address, telephone and billing information. The server 412 is coupled to systems of each of the partner (partner's service), such as partner service 418. Thus, in one aspect of the present configurations, iGate may act as a central point for automatically associating the master account with the partner accounts and for providing the contents from the various partner services 418. Within an Internet Protocol Television (IPTV) network, the iGate 412, in one aspect, creates a reverse-proxy that simulates the user, in accordance with an SAML (Security Assertion Markup Language) message from an enterprise application interface (EAI) service 414. In general, SAML is an XML-based framework for communicating user authentication, entitlement, and attribute information. SAML allows entities to make associations regarding the identity, attributes, and entitlements of a subject (the entity may be a person) to other entities, such as a partner company or another enterprise application. The SAML message from the EAI service 414 includes a Primary Member ID and a Product ID, both of which are retrieved from an iGate LDAP (Lightweight Directory Access Protocol) database 416. The iGate 412 may obtain a preferences file from the iGate LDAP database 416 that can be used automatically to associate the user 402 (or the client application) with the master account based upon master account information obtained from the database 416.

The preferences file may also be used to establish an association between the user 402 and a third-party that is selected from a predetermined set of partner's service 418. In response to the user identification, the iGate 412 may automatically associate the master account with the partner's service 418, in response to the request that is received from the user 402 via the RDP application launcher 410. The iGate 412 may establish a path or connection to the partner's service 418, which may be a website having a URL. The iGate 412 may also provide the user 402 with access to the partner's service 418 via the master account. The partner RDP may send a SOAP message that requests SAML assertion and the iGate may send a SOAP message response with the SAML assertion to the Partner RDP. In general, SOAP is a lightweight protocol for exchange of information in a decentralized, distributed environment. It is an XML-based protocol that includes an envelope that defines a framework for describing what is in a message and how to process it, a set of encoding rules for expressing instances of application-defined datatypes, and a convention for presenting remote procedure calls and responses. The iGate receives from the partner's RDP 418 an HTTP response with personalized page associated with the customer account. The iGate also receives EAI authentication from the RDP application launcher and redirects the EAI authentication service. The iGate returns the content received from the partner RDP to the RDP application launcher 410, which converts it into a display form and sends it on to the customer device 404.

The partner's service 418 may be hosted outside of the IPTV network. The partner service's 418 may be, for example, a MyYahoo stock account, a MyYahoo weather account, a favorite Disney Online game, a cable television news channel, and/or bank's online bill payment website. The partner's service 418 may be accessible from outside the IPTV network, and may be accessible from machines other than the EAI service 414.

By providing the user 402 with access to the partner's service 418 via the master account, the iGate 412 can also facilitate television commerce by providing transactional billing and fulfillment between the partner's service 418 and the user 402. The user 402 may engage in a commercial transaction associated with the partner's service 418. Although the system 400 is described using a particular architecture, the system may utilize any suitable system or architecture that performs the functions and methods described herein.

Figure 5:
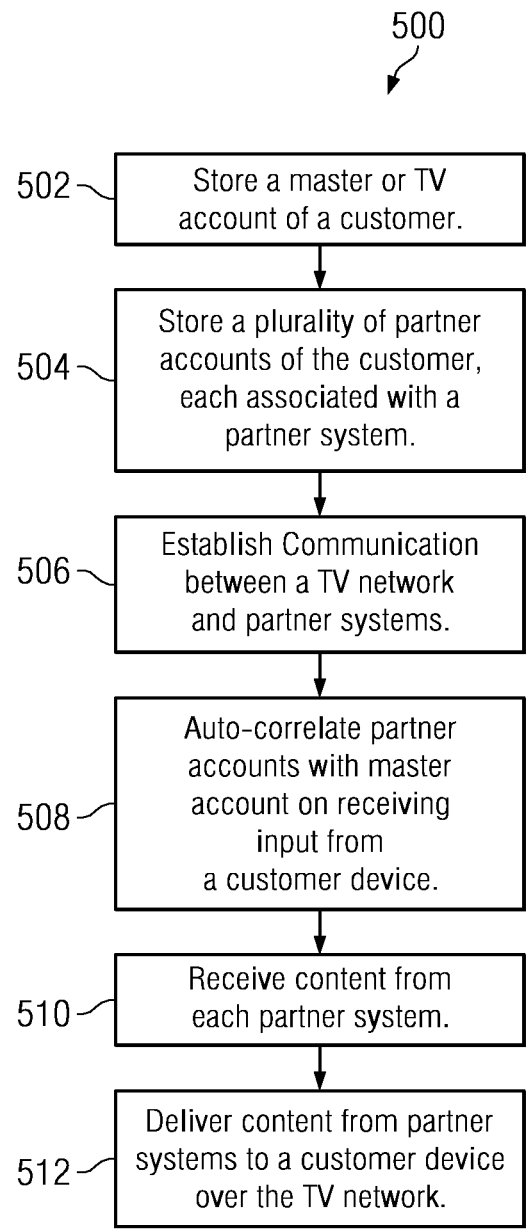
FIG. 5 shows a flow chart of an exemplary method according to one aspect of the present disclosure.

FIG. 5 shows a flow chart of an exemplary method 500 according to one aspect of the present disclosure. As shown in block 502, a master account of a customer is stored in a database associated with the provision of a television service. The master account may be any suitable identifier, such as an IP address, STB identification number, SIP URI, etc. The method also stores in a database (Block 504) one or more account numbers or identifiers of the customer (partner accounts) with various content providers, each such account being recognizable by a corresponding partner system that delivers content upon authentication of the account. As shown in block 506, the method establishes communication between the TV network and each of the partner systems in a manner that the network can obtain content from the partner systems that may be specific to a customer upon sending information relating to the account of the customer with the partner. Upon receiving an identifier from a customer device, partner accounts are automatically correlated with the master account without requiring the customer to enter the partner accounts, as shown in block 508. The contents from the partner systems is retrieved by authenticating or sending the partner accounts to the corresponding partner systems (block 510), and delivering to the customer premise over the television network (block 512).

As described above, the system and method of the present disclosure provides a backend auto-account association process that may be transparent to customers as it links customers' TV accounts (and viewing experience) with their accounts in other relevant domains, such as broadband, voice, wireless and can also pass along account information (which may be done by a one touch or click approval) to other parties for purpose of obtaining contents from such partners, including transactional billing. The auto-account association allows a TV customer to access on the television predefined broadband preferences (such as Yahoo weather, sports, finance, etc.) by a single touch of a remote device without the need to enter the broadband account user name and password. The system and method automatically handles the account association. Additionally, the system enables interactivity, such as playing games against others online, programming a digital video recorder via a telephone without specifying set top box identification, viewing bills, voice services and on-TV caller ID associated with the customers VoIP account. For example, the system may automatically associate the master account with an account for a wireless service, such as a cellular telephone account and provide on a TV channel or through an icon on the TV selected information about the cellular phone account (partner account), without requiring the customer to enter any account relating to the cellular telephone, such as the telephone number. The information provided for display on the TV may include telephone billing information, call log (received and called calls), voice information message, address book that may be stored in a network database, etc. Auto-account association also can leverage network infrastructure for seamless linking of broadband and voice accounts outside of a television reference, so that a customer may check web settings on a wireless device without the need to log on or authenticate. As noted earlier, auto-account association also can enable customers to order items through the television via a single click using their television account information passed along to the relevant vendors. Additionally, auto account association can enable customers to wager on television, and settle accounts through customer information associated with such accounts stored in a database. Also, it will be obvious that in addition to simplified user experience, the auto-account association allows bundling of a variety of services over the television, including broadband and voice services.

Figure 6:
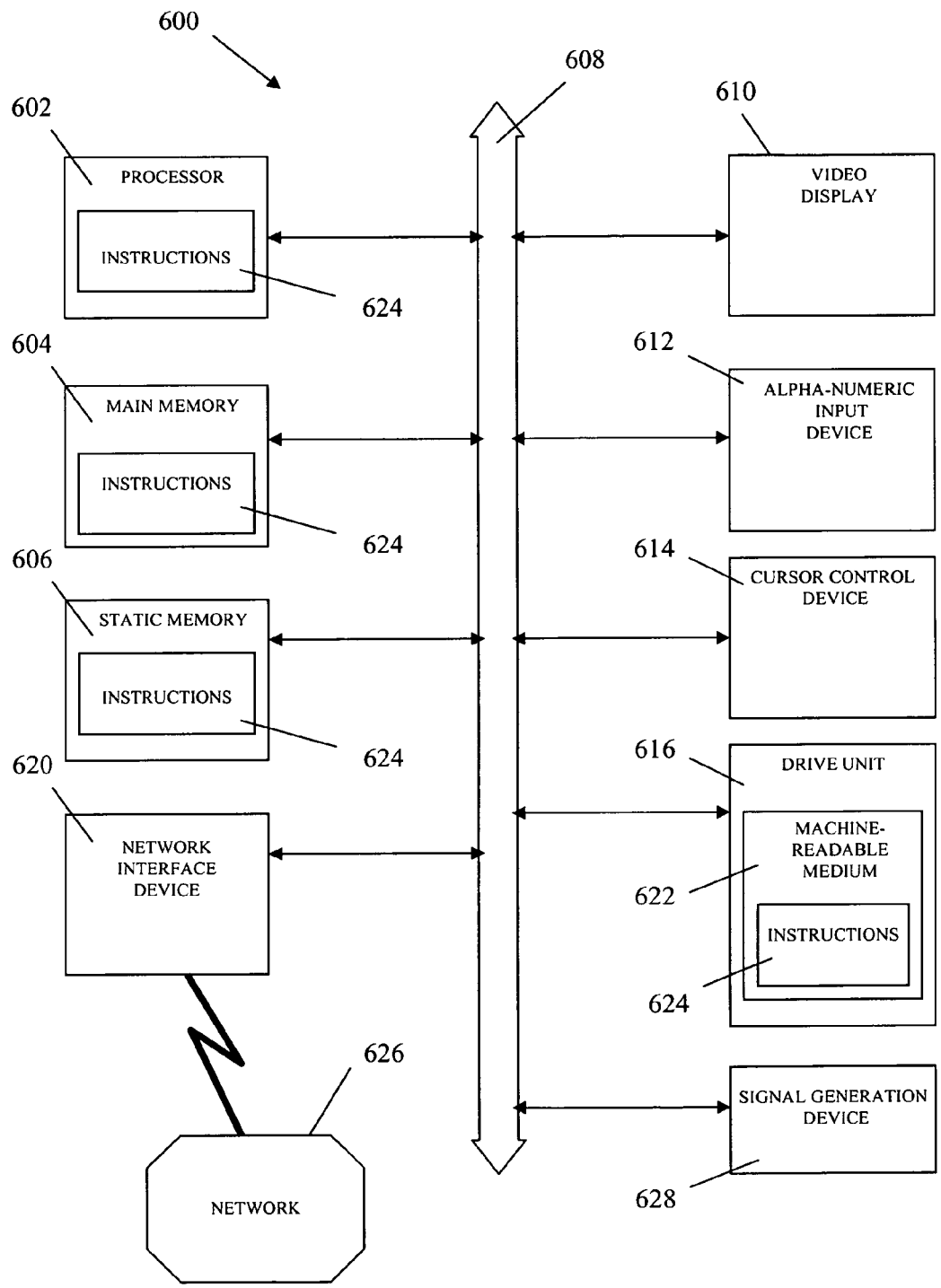
FIG. 6 is a diagrammatic representation of a machine in the form of a computer system within which a set of instructions, when executed, may cause the machine to perform any one or more of the methodologies discussed herein.

The methods and the computer programs described herein, including account association and provision of content over a television network may be implemented by a computer system, such as an exemplary system shown in FIG. 6. FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 650 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for providing content to a user over a television network, the system comprising:
 a server having access to a remote desktop application, the server configured to respond to detecting a user request to access web content provided by a service partner by launching the remote desktop application wherein the remote desktop application is configured to:
 access user television services account information and user partner account information stored in a database accessible to the server, wherein the user television services account information is associated with a television services account for providing a television service to the user over the television network and wherein the user partner account information is associated with a service partner account for providing a web content service to the user by the service partner; and
 associate the service partner account with the television services account to invoke the web content service over the television network wherein the user request does not provide the service partner account information.

2. The system of claim 1, wherein the server is configured to authenticate the service partner account of the user based on the partner account information.

3. The system of claim 2, wherein the server is configured to receive an authentication of the television service account from the set top box prior to associating the television service account with the partner account.

4. The system of claim 1, wherein the server is configured to launch the remote desktop application in response to a user selection of a set top box channel and wherein the request indicates the selected channel.

5. The system of claim 4, wherein the server is configured to launch the remote desktop application by mapping the set top box channel to a remote desktop universal resource locator.

6. The system of claim 1, wherein the web content includes an interactive web page and wherein the server is configured to enable the user to interact with the interactive web content.

7. The system of claim 1, wherein the partner account information identifies a plurality of partner accounts the user has established with a plurality of service partners for providing web content.

8. The system of claim 7, wherein each of the plurality of partner accounts is associated with a respective set top box channel.

9. A computer readable memory medium including program instructions executable to:
respond to detecting a user request to access web content associated with a web content service provided to the user by a service partner by launching a remote desktop application configured to:
access television services account information and service partner account information stored in a database, the television services account information relating to a television services account of the user for providing a television service to the user over the television network and the service partner account information relating to a service partner account of the user for providing the web content service; and
automatically associate the service partner account with the television services account and invoke the web content service, via the television network, in response to the user request, wherein the user request does not indicate the service partner account and wherein the web content service is configured to:
generate redrawn web content graphics based on the web content; and
provide the redrawn web content graphics to a set top box associated with the user over the television network.

10. The computer readable medium of claim 9, further including instructions to authenticate the service partner account of the user based on the service partner account information.

11. The computer readable medium of claim 9, further including instructions to launch the remote desktop application in response to a user selection of a set top box channel and wherein the user request indicates the selected channel.

12. The computer readable medium of claim 11, wherein launching the remote desktop application includes mapping the set top box channel to a remote desktop universal resource locator.

13. The computer readable medium of claim 9, wherein the web content includes an interactive web page and wherein the program instructions include instructions to enable the user to interact with the interactive web content.

14. The computer readable medium of claim 9, wherein the service partner account information identifies a plurality of partner accounts the user has established with a plurality of service partners for providing web content.

15. The computer readable medium of claim 14, wherein each of the plurality of partner accounts is associated with a respective set top box channel.

16. The computer readable medium of claim 9, wherein the program instructions include instructions to receive an authentication of the television service account from the set top box prior to associating the television service account with the service partner account.

17. A method of providing web content over a television network, the method comprising:
responding to detecting a user request to access web content by launching a remote desktop application configured for:
accessing a database to retrieve television services account information relating to a television services account of the user for providing a television service to the user over the television network and partner account information relating to a partner account of the user for providing a web content service to the user by a service partner, wherein the user request is not indicative of the partner account information; and
associating the television services account with the partner account information relating to provision of web content to the user by a service partner to invoke the web content service, the web content service configured for:
generating redrawn web content graphics based on the web content; and
providing the redrawn web content graphics to a set, top box associated with the user over the television network.

18. The method of claim 17, further comprising: authenticating the partner account of the user based on the partner account information.

19. The method of claim 17, further comprising launching the remote desktop application in response to a user selection of a set top box channel and wherein the request indicates the selected channel.

20. The method of claim 19, wherein launching the remote desktop application includes mapping the set top box channel to a remote desktop universal resource locator.

21. The method of claim 17, wherein the web content includes an interactive web page and wherein the method further includes enabling the user to interact with the interactive web content.

* * * * *